United States Patent [19]
Pan et al.

[11] Patent Number: 6,078,938
[45] Date of Patent: *Jun. 20, 2000

[54] METHOD AND SYSTEM FOR SOLVING LINEAR SYSTEMS

[75] Inventors: ShaoWei Pan, Schaumburg, Ill.; Srinivas L. Panchumarthi; Ramamoorthy Srinath, both of Bangalore, India; Shay-Ping T. Wang, Long Grove, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,471

[22] Filed: May 29, 1996

[51] Int. Cl.[7] ........................................ G06F 1/02
[52] U.S. Cl. ........................ 708/500; 708/501; 708/502
[58] Field of Search .................... 364/736.01, 736.02, 364/736.03, 748.2, 754.02; 708/500, 501, 502, 589, 621

[56] References Cited

U.S. PATENT DOCUMENTS

| | | | |
|---|---|---|---|
| 3,697,703 | 10/1972 | Clark, Jr. et al. | 179/1 |
| 3,748,451 | 7/1973 | Ingwersen | 235/156 |
| 4,037,093 | 7/1977 | Gregg et al. | 235/164 |
| 4,156,299 | 5/1979 | Majerski et al. | 364/757 |
| 4,626,825 | 12/1986 | Burleson et al. | 340/347 |
| 4,787,057 | 11/1988 | Hammond | 364/754 |
| 4,914,615 | 4/1990 | Karmarkar et al. | 364/754 |
| 5,136,538 | 8/1992 | Karmarkar et al. | 364/754 |
| 5,301,342 | 4/1994 | Scott | 395/800 |
| 5,319,586 | 6/1994 | Gupta et al. | 364/735 |
| 5,604,911 | 2/1997 | Ushiro | 395/800 |
| 5,629,845 | 5/1997 | Liniger | 364/172 |
| 5,685,008 | 11/1997 | Pan et al. | 395/800 |
| 5,717,621 | 2/1998 | Gupta et al. | 364/735 |

FOREIGN PATENT DOCUMENTS

| | | | |
|---|---|---|---|
| WO 93/17383 | 9/1993 | WIPO | G06F 7/52 |

OTHER PUBLICATIONS

Numerical Analysis Fifth Edition, Richard L. Burden et al., PWS Publishing Company, 1993, pp. 406–411.

Table–Look Algorithms for Elementary Functions and Their Error Analysis, Ping Tak Peter Tang, Proceedings of 10th Annual IEEE Symposium on Computer Arithmetic's, pp. 232–236, Jun. 1991.

A 30–b Integrated Logarithmic Number System Processor, Lawrence K. Yu et al., IEEE Journal of Solid–State Circuits, vol. 26, No. 10, Oct. 1991, pp. 1433–1440.

An Architecture for Addition and Substraction of Long Word Length Numbers in the Logarithmic Number System, David M. Lewis, IEEE Transactions on Computers, vol. 39, No. 11, Nov. 1990, pp. 1325–1336.

Algorithmic Design for a 30 bit Integrated Logarithmic Processor, David M. Lewis et al., Proceedings on 9th Symposium on Computer Arithmetic, 1989, IEEE Comp. Soc. Press, pp. 192–199.

A Multiplier–Less Digital Neural Network, L. Spaanenburg et al., Proceedings of the 2nd International Conference on Microelectronics for Neural Networks, German Section of the Institute of Electrical and Electronics Engineers, Published by Kyrill & Method Verlag, Oct. 16–18, 1991.

(List continued on next page.)

*Primary Examiner*—Glenn A. Auve
*Assistant Examiner*—Tim Vo
*Attorney, Agent, or Firm*—James E. Gauger

[57] ABSTRACT

A system and method of using a computer processor (34) to generate a solution to a linear system of equations is provided. The computer processor (34) executes a Jacobi iterative technique to produce outputs representing the solution. Multiplication operations required by the iterative technique are performed using logarithmic arithmetic. With logarithmic arithmetic, a multiplication operation is accomplished using addition. For a given n×n matrix A, the computer processor (34) can compute an inverse matrix $A^{-1}$ by repeatedly executing the iterative technique to solve n linear systems.

24 Claims, 3 Drawing Sheets

U.S. PATENT DOCUMENTS

A Logarithmic Vector Processor for Neural Net Applications, Steve Richfield, IEEE First International Conference on Neural Networks, Jun. 21–24, 1987, pp. 22–28.

Comments on An Architecture for Addition and Substraction of Long Word Length Numbers in the Logarithmic Number System, M. Arnold et al., IEEE Transactions on Computers, vol. 41, No. 6, 1992, pp. 786–788.

Redundant Logarithmic Arithmetic, Mark G. Arnold et al., IEEE Transactions on Computers, vol. 39, No. 8, Aug. 1990, pp. 1077–1086.

Redundant Logarithmic Number Systems, M.G. Arnold et al., Proceedings of 9th Symposium on Computer Arithmetic, 1989, IEEE Comp. Soc. Press, pp. 144–151.

Improved Accuracy for Logarithmic Addition In DSP Applications, Mark G. Arnold et al., ICASSP 88: International Conference of Acoustics, Speech and Signal Processing, Published IEEE, pp. 1714–1717, vol. 3.

Applying Features of IEEE 754 to Sign/Logarithm Arithmetic, Mark G. Arnold et al., IEEE Transactions on Computers, vol. 41, No. 8, Aug. 1992, pp. 1040–1050.

An Accurate LNS Arithmetic Unit Using Interleaved Memory Function Interpolar, David M. Lewis, Proceedings of 11th Symposium on Computer Architecture, 1993, IEEE Comp. Soc. Press, pp. 2–9.

Interleaved Memory Function Interpolars with Application to an Accurate LNS Arithmetic Unit, David M. Lewis, IEEE Transactions on Computers, vol. 43, No. 8, Aug. 1994, pp. 974–982.

A 10–ns Hybrid Number System Data Execution Unit for Digital Signal Processing Systems, Fang–shi Lai, IEEE Journal of Solid–State Circuits, vol. 26, No. 4, Apr. 1991, pp. 590–598.

A Hybrid Number System Processor with Geormetric and Complex Arithmetic Capabilities, Fang–shi Lai et al., IEEE Transactions on Computers, vol. 40, No. 8, Aug. 1991, pp. 952–961.

The Efficient Implementation and Analysis of a Hybrid Number System Processor, Fang–shi Lai, IEEE Transactions on Circuits and Systems–II: Analog and Digital Signal Processing, vol. 40, No. 6, Jun. 1993, pp. 382–392.

METHOD AND SYSTEM FOR SOLVING LINEAR SYSTEMS

RELATED INVENTIONS

The present invention is related to the following invention which is assigned to the same assignee as the present invention:

The subject matter of the above-identified related invention is hereby incorporated by reference into the disclosure of this invention.

TECHNICAL FIELD

The present invention relates generally to computers and, in particular, to a method and system for solving linear systems of equations.

BACKGROUND OF THE INVENTION

Linear systems of equations are associated with many problems in engineering and science, as well as with applications of mathematics to the social sciences and economic problems. A linear system can be represented by the set of equations:

$$E_1: a_{11}x_1 + a_{12}x_2 + \ldots + a_{1m}x_m = b_1 \quad (1)$$
$$E_2: a_{21}x_1 + a_{22}x_2 + \ldots + a_{2m}x_m = b_2$$
$$\vdots$$
$$E_n: a_{n1}x_1 + a_{n2}x_2 + \ldots + a_{nm}x_m = b_n$$

A linear system is often replaced by a matrix, which contains all the information necessary to determine a solution, but in a compact form. A matrix is a rectangular array of elements with end rows and end columns in which not only is the value of an element important, but also its position in the array. A notation for an n×m (n by m) matrix is a capital letter such as A for the entire matrix and a lower case letter with double subscripts, such as $a_{ij}$, to refer to the entry at the intersection for the ith row and jth column. For example, a matrix representing the coefficients of the above system of equations (1) would have the form:

$$\text{and } A = (a_{ij}) = \begin{bmatrix} a_{11} & a_{12} & \ldots & a_{1m} \\ a_{21} & a_{22} & \ldots & a_{2m} \\ \vdots & \vdots & & \vdots \\ a_{n1} & a_{n2} & \ldots & a_{nm} \end{bmatrix} \text{ where } 1 \le i \le n, \ 1 \le j \le m \quad (2)$$

The entire linear system given by (1) can be represented by a matrix and two vectors:

$$\begin{bmatrix} a_{11} & a_{12} & \ldots & a_{1m} \\ a_{21} & a_{22} & \ldots & a_{2m} \\ \vdots & \vdots & & \vdots \\ a_{n1} & a_{n2} & \ldots & a_{nm} \end{bmatrix} \begin{bmatrix} x_1 \\ x_2 \\ \vdots \\ x_n \end{bmatrix} = \begin{bmatrix} b_1 \\ b_2 \\ \vdots \\ b_n \end{bmatrix} \quad (3)$$

In equation (3), the columns $x_i$ and $b_i$ represent the two vectors.

Broadly speaking, there are two different classes of techniques for solving linear systems of equations: direct techniques and iterative techniques. Direct techniques are methods that give an answer in a fixed number of steps, subject only to round off errors created by the limits of precision in digital computers. Iterative techniques for solving a linear system start with an initial approximation to the solution and generate a sequence of vectors that converge to the solution.

By representing a linear system of equations as a matrix, a direct technique called Gaussian elimination with backward substitution can be used to solve the system. Gaussian elimination is well known in the art and further details can be found in "Numerical Analysis", R. Burden & D. Faires, Fifth Edition, PWS Publishing Co., 1993, P. 324–331. Typically, a computer algorithm for executing Gaussian elimination is slow, especially with matrices of large dimensions.

Iterative techniques involve a process that converts a system of equations Ax=b, where A represents a matrix and b and x represent vectors (see above equation (3)), into an equivalent system having the form x=Tx+c for some matrix T and vectors c and x. After an initial vector $x^{(0)}$ is selected, the sequence of approximate solutions is recursively generated by computing:

$$x^{(k)} = Tx^{(k-1)} + c, \text{ for each } k=1,2,3, \quad (4)$$

In Equation (4), $x^{(k)}$ represents an approximate solution corresponding to the kth iteration, while $x^{(k-1)}$ represents the approximate solution generated by the prior iteration.

Iterative techniques are seldom used for solving linear systems of small dimensions, since the time required for sufficient accuracy exceeds that required for direct techniques such as the Gaussian elimination method. For large systems with a high percentage of zero entries, however, these techniques are relatively efficient in terms of both computer storage and computational time. Systems of this type arise frequently in circuit analysis and in the numerical solution of boundary value problems and partial differential equations. Using an iterative technique to solve linear systems requires large amounts of computational time. However, in many applications, such as systems with a low percentage of zero entries, conventional computer technology does not provide sufficient performance in terms of speed. There is thus a need for a computer-based approach of solving linear systems that is computationally efficient and fast.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It is an advantage of the present invention to provide a computer-based method of solving linear systems of equations that offers a significant improvement in terms of computational speed. It is also an advantage of the present invention to provide a computer-based method that can be used for matrix inversion. Another advantage of the present invention is that it provides a computer-based method that can be executed using inexpensive digital integrated circuits.

Figures 1, 2:
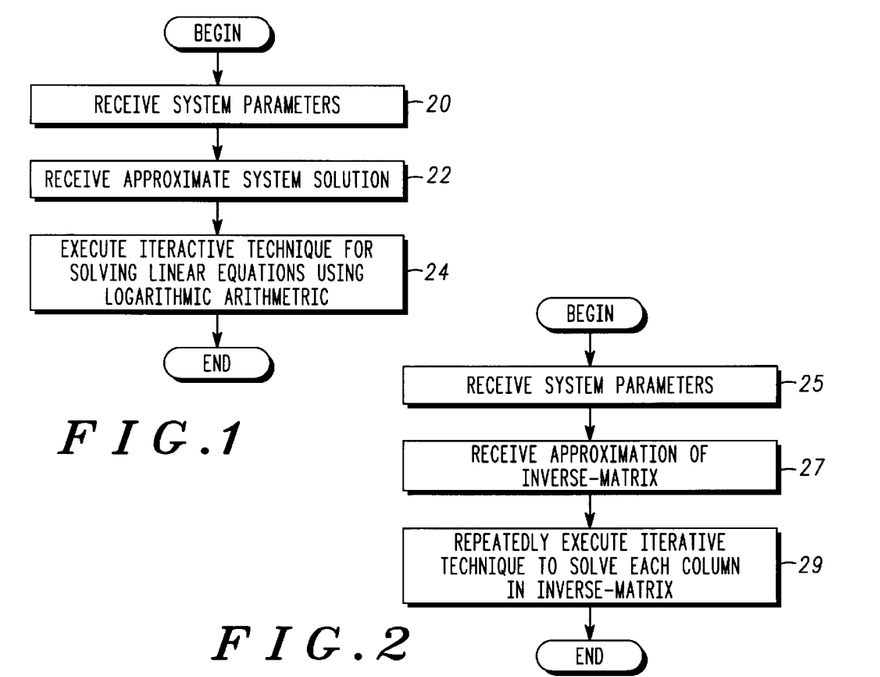
FIG. 1 shows a flow diagram of a method of solving linear equations that is in accordance with a first embodiment of the present invention.
FIG. 2 shows a flow diagram of a method of finding an inverse matrix that is in accordance with a second embodiment of the present invention.

FIG. 1 shows a flow diagram of a method of solving a system of linear equations that is in accordance with a first embodiment of the present invention. In box 20, parameter signals characterizing the linear system Ax=b are received by a computer processor. The parameter signals represent the coefficient matrix A and the vector b. These parameter signals are transformed into coefficient and constant signals. Next, in box 22, input signals representing an approximate solution to the linear system of equations are received.

In box 24, output signals representing the solution are generated by using the computer processor to perform an iterative technique of solving linear systems. The iterative technique includes a plurality of multiplication operations involving the coefficient signals and the input signals as operands. These operations are performed using logarithmic arithmetic.

With logarithmic arithmetic, each of the multiplication operations is accomplished using addition, rather than multiplication. For the purpose of the present disclosure, logarithmic arithmetic is defined as the process of converting operand signals into log signals, summing the log signals to produce a sum, and then converting the sum into an inverse-log signal. This process is used in lieu of a multiplication operation. Logarithmic arithmetic provides advantage because a digital circuit for executing the iterative technique requires substantially less power and space than a circuit employing conventional multipliers.

The iterative technique of solving linear systems is based on either the Jacobi iterative technique or the Gauss-Seidel iterative technique. Preferably, the Jacobi iterative technique is used. The Jacobi iterative technique consists of solving the ith equation in Ax=b for $x_i$ to obtain (provided $a_{ii} \neq 0$):

$$x_i = \sum_{\substack{j=1 \\ j \neq k}}^{n} (-a_{ij} x_j / a_{ii}) + b_i / a_{ii}, \quad \text{for } i = 1, 2, \ldots, n \quad (5)$$

and generating each $x_i^{(k)}$ from components of $x^{(k-1)}$ for $k \geq 1$ by $$x_i^{(k)} = \sum_{\substack{j=1 \\ j \neq i}}^{n} (-a_{ij} x_j^{(k-1)} / a_{ii}) + b_i / a_{ii}, \quad \text{for } i = 1, 2, \ldots, n. \quad (6)$$

Equation (6) can be written in the shorthand form $x^{(k)} = Tx^{(k-1)} + c$ of Equation (4), where T represents a Jacobi coefficient matrix ($t_{ij}$), such that $t_{ij} = -a_{ij}/a_{ii}$ if $i \neq j$ and $t_{ij} = 0$ if i=j. The vector c represents a vector of Jacobi constant signals $b_i/a_{ii}$ and k is an integer representing an iteration index. The multiplication of the Jacobi coefficient signals $-a_{ij}/a_{ii}$ with the input signals xj is performed using logarithmic arithmetic.

The Gauss-Seidel iterative technique is similar to the Jacobi iterative technique, but uses the most recently computed values $x_{i-1}^{(k)}$ to calculate $x_i^{(k)}$. The Gauss-Seidel technique is based on the equation:

$$x_i^{(k)} = -\sum_{j=1}^{i-1} (-a_{ij} x_j^{(k)} / a_{ii}) - \sum_{j=i+1}^{n} (a_{ij} x_j^{(k-1)} / a_{ii}) + b_i / a_{ii}, \quad (7)$$

for i=1, 2, . . . , n.

There are linear systems for which the Jacobi technique converges and the Gauss-Seidel technique does not, and others for which the Gauss-Seidel technique converges and the Jacobi does not. Generally, the Gauss-Seidel technique converges faster than the Jacobi technique, but requires more memory bandwidth to buffer the values of $x_j^{(k)}$ and $x_j^{(k-1)}$.

The iterative techniques described above require that $a_{ii} \neq 0$ for each i=1, 2, . . . , n. If it is not, a reordering of the system equations can be performed so that no $a_{ii}=0$. Various pivoting strategies can be used to interchange matrix rows and columns to ensure that the diagonal elements $a_{ii}$ have non-zero values and to create dominance in the matrix diagonal values, that is, the elements $a_{ii}$ are as large as possible. A dominant diagonal allows the iterative techniques to converge on a solution with fewer iterations. The pivoting strategies include maximal column pivoting (partial pivoting) and scaled-column pivoting.

When executed, the iterative techniques continue until a stopping criterion is met. In one embodiment of the current invention, the iterative technique is repeatedly executed until reaching a predetermined maximum number of iterations. In another embodiment of the invention, the iterative technique is executed until the distance between the results from two successive iterations is less than a predetermined threshold. For this purpose, any convenient norm can be used, such as the $l\infty$ norm given by:

$$|x^{(k)} - x^{(k-1)}|\infty / |x^{(k)}|\infty < \rho. \quad (7)$$

In Equation (7), x represents a solution vector having the elements $x_i$ and r represents the predetermined threshold.

Other iterative techniques, such as the relaxation technique, can also be used by various embodiments of the present invention.

FIG. 2 shows a flow diagram of a method of inverting a matrix that is in accordance with a second embodiment of the present invention. The operation of matrix inversion has a broad range of applicability in many areas of engineering, such as digital signal processing, voice coding, 3-D computer graphics, and antenna beam steering. Matrix inversion is related to solving linear systems and can be performed using the iterative techniques described above in conjunction with FIG. 1.

Several definitions are helpful in understanding the connection between inverse matrices and linear systems. A square matrix is defined as having the same number of rows as columns. A diagonal matrix is defined as a square matrix ($d_{ij}$), with ($d_{ij}$)=0 whenever $i \neq j$. An identity matrix $I=(\delta_{ij})$ is a diagonal matrix with entries:

$\delta_{ij} 1$, if i=j, 0, if $i \neq j$.

Where two matrices are related by the equation AC=I, the matrix C is called the inverse of matrix A. A matrix without an inverse is called singular. Typically, the inverse matrix C is designated by the symbol $A^{-1}$.

To find $A^{-1}$ for a given n×n matrix A, we solve n linear systems in which the jth column of the inverse matrix is represented by the vector x and the jth column of the identity matrix I is represented by the vector b of the linear system Ax=b. In other words, for each j, we solve the linear system $AA_j^{-1} = I_j$, where $A_j^{-1}$ represents the jth column of $A^{-1}$, j=1, 2, ..., n, $$A_j = \begin{bmatrix} a_{1j}^{-1} \\ a_{2j}^{-1} \\ \vdots \\ a_{nj}^{-1} \end{bmatrix}, \text{ and}$$

$$I_j = \begin{bmatrix} 0 \\ \vdots \\ 0 \\ 1 \\ 0 \\ \vdots \\ 0 \end{bmatrix}, \text{ where the value 1 appears in the jth row.}$$

The method of FIG. 2 includes the following steps. In box 25, parameter signals characterizing the matrix A and the identity matrix I are received by the computer processor. These parameter signals are transformed into coefficient signals and constant signals. Next, in box 27, input signals representing an approximation of the inverse matrix $A^{-1}$ are received.

In box 29, output signals representing the inverse matrix are generated by using the computer processor to perform one of the above-described iterative techniques of solving linear systems. The iterative technique includes multiplication operations involving the coefficient signals and the input signals as operands. These operations are performed using logarithmic arithmetic. The iterative technique is repeated for each column in the matrix.

The stopping criteria and pivoting techniques described above for FIG. 1 can likewise be applied to the method of FIG. 2.

Figure 3:
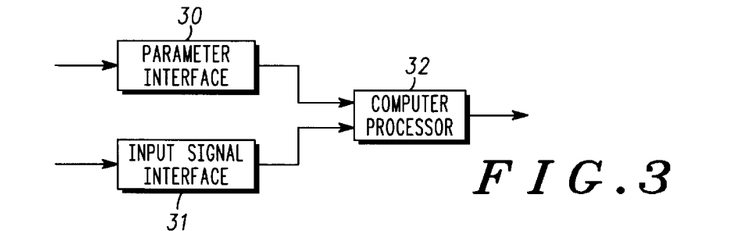
FIG. 3 shows a system for computing solutions to linear systems or solving matrix inversion that is in accordance with a third embodiment of the present invention.

FIG. 3 shows a system for computing inverse matrices or solutions to linear systems that is in accordance with a third embodiment of the present invention. The system comprises a parameter interface 30, an input signal interface 31, and a computer processor 32.

The parameter interface 31 receives parameter signals representing the coefficient matrix A and the vector b of the linear system Ax=b. Preferably, the parameter signals are transformed into Jacobi coefficient $a_{ij}/a_{ii}$ and constant signals $b_i/a_{ii}$ by a means external to the system that is connected the parameter interface 31, such as a microprocessor executing a computer program. However, the parameter interface 31 or computer processor 32 can also include a means for transforming the parameter signals into Jacobi signals. For instance, the computer processor 32 can include a means to perform the division operation of the transformation using log-based arithmetic.

The input signal interface 31 receives the input signals representing an approximate solution $x^{(0)}$ to the linear system of equations.

In an alternative embodiment of the invention, the parameter and input interfaces 30–31 are combined in to a single interface device capable of receiving both inputs and parameters. The interfaces 30–31 can be any means for conveying parameter and input signals to the computer processor 32, including a digital data bus and its associated transfer protocols or a data port such as those used by microprocessors and co-processors.

The computer processor 32 generates output signals by executing a sequence of computer program instructions for performing one of the above-described iterative techniques of solving linear systems of equations. The iterative technique includes multiplication operations involving the coefficient and input signals and being performed with logarithmic arithmetic. Preferably, the computer processor 32 executes the Jacobi iterative technique.

Figure 4:
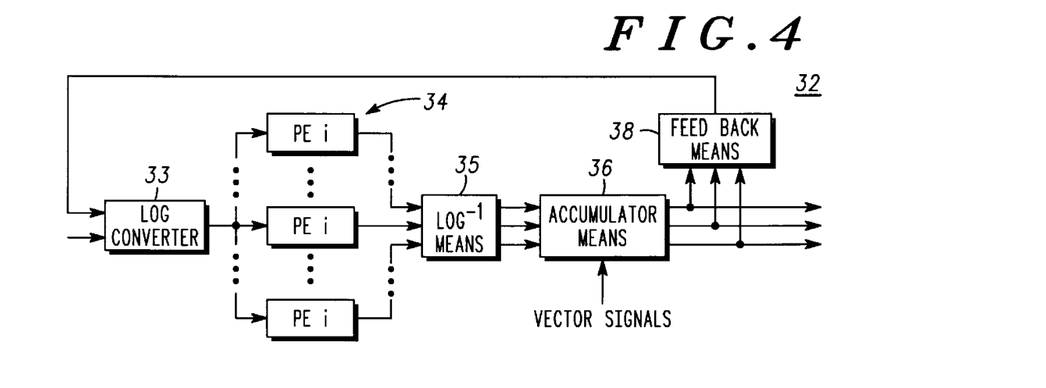
FIG. 4 shows a block diagram of the computer processor 32 shown in FIG. 3.

FIG. 4 shows a block diagram of an exemplary embodiment of the computer processor 32 of FIG. 3. The computer processor 32 includes a log converter 33, a plurality of processing elements (PEs) 34, an inverse-log means 35, an accumulation means 36, and a feedback means 38. The log converter 33 is coupled to both the parameter and input interfaces 30–31 and converts coefficient and inputs signals into log signals. The input signals $xj^{(k-1)}$ are received sequentially from either the input signal interface 30 or feedback means 38.

Each processing element is dedicated to generating a particular element $x_i^{(k)}$ of the solution vector. Each of the processing elements 34 includes an adder circuit for generating a sum signal having the form $[\log(a_{ij}/a_{ii}) + \log(xj^{(k-1)})]$. The adder circuit can be any means for summing two inputs, such as a carry-look-ahead, carry-select, or ripple adder. Furthermore, the processing elements can include means for storing the converted coefficient signals representing the value of $\log(a_{ij}/a_{ii})$. Preferably, the processing elements 34 perform their additions concurrently to contemporaneously produce the sum signals.

The inverse-log means 35 converts sum signals into inverse-log signals. The inverse-log signals represent the results of the multiplication operations $(a_{ij}/a_{ii}) * xj^{(k-1)}$.

The accumulation means 36 receives the vector of constant signals $b_i/a_{ii}$ from the parameter interface 30. Essentially, the accumulation means 36 provides a mechanism for respectively summing the sequences of inverse-log signals from the processing elements 34 and then adding the summed sequences to corresponding constant signals to yield approximate solution signals $x_i^{(k)}$ according to Equation (6).

The feedback means 38 checks to determine whether the stopping criteria has been met. If not, the feedback means 38 provides the approximate solution signals as the next sequence of input signals.

Figure 5:
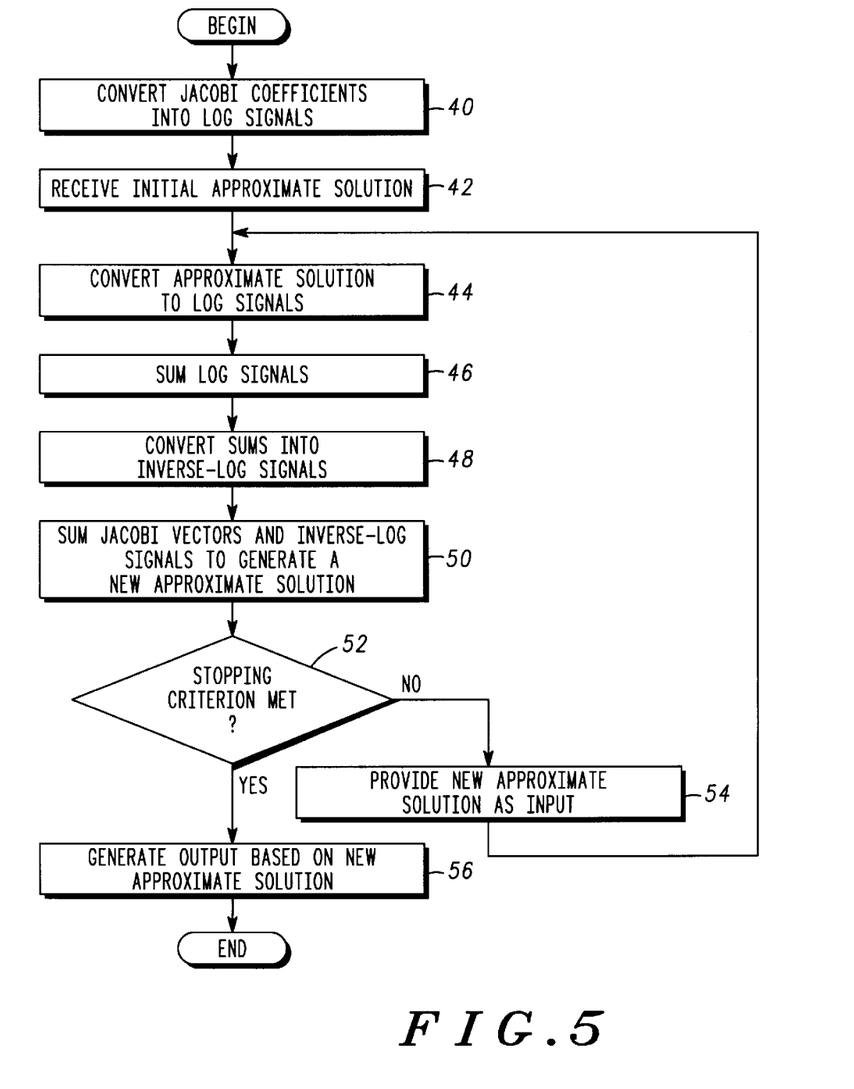
FIG. 5 shows a flow diagram of a method of solving a system of linear equations using the computer processor 32 of FIG. 4.

FIG. 5 shows a flow diagram of a method of solving a system of linear equations using the computer processor 32 shown in FIG. 4.

In box 40, Jacobi coefficient signals $a_{ij}/a_{ii}$ are converted into a plurality of first log signals. In box 42, input signals representing an initial approximate solution $xj^{(0)}$ to the linear system of equations are received by the computer processor. In box 44, the input signals are converted into a plurality of second log signals. The sign bits of the coefficient and input signals bypass the log conversion and are later recombined with the inverse-log signals.

Next, in box 46, the first and second log signals are distributed to the processing elements which sum corresponding ones of the log signals to produce the sum signals.

In box 48, the sum signals are converted into inverse-log signals. Each inverse-log signal includes a sign bit that represents the results of an exclusive-or of the sign bits of corresponding input and Jacobi coefficient signals.

In box 50, the inverse-log signals and corresponding Jacobi vector signals $b_i/a_{ii}$ are summed according to Equation (6) to generate approximate solution signals $x_i^{(k)}$.

In decision box 52, a check is made to determine whether the stopping criterion has been met. In one embodiment of the invention, the stopping criterion is attained when the distance between solutions from two successive iterations is less than a predetermined threshold. In an alternative embodiment of the invention, the criterion is reached after repeating the steps of boxes 44–54 a predetermined number of times.

If the stopping criterion has been met, the method proceeds to box 56 where output signals are generated as a function of the approximate solution signals. If the criterion has not been met, the method continues with box 54.

In box 54, the approximate solution signals are provided as the next sequence of input signals and the method returns to box 44.

Figure 6:
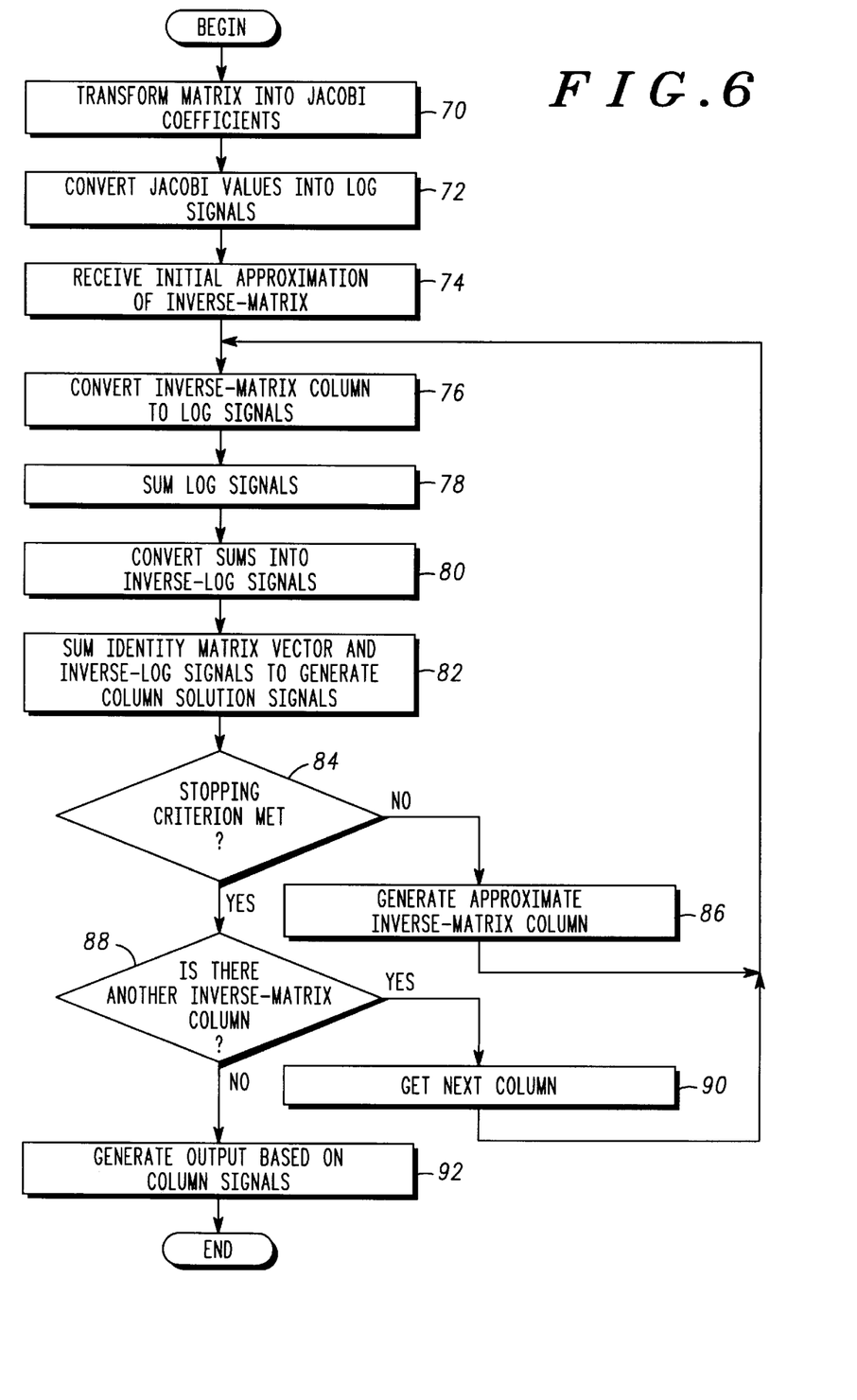
FIG. 6 shows a flow diagram of a method of inverting a matrix using the computer processor 32 of FIG. 4.

FIG. 6 shows a flow diagram of a method of inverting a matrix using the computer processor 32 of FIG. 4.

In box 70, signals representing the matrix A are transformed into Jacobi coefficient $a_{ij}/a_{ii}$ and constant signals $1/a_{ii}$. In box 72, the Jacobi coefficient signals are converted into first log signals. In box 74, input signals representing an initial approximation of an inverse matrix column $A_j^{-1(0)}$ are received by the computer processor 32. Next, in box 76, the input signals are converted into second log signals.

In box 78, the first and second log signals are distributed to the processing elements, which sum corresponding ones of the first and second log signals to produce the sum signals.

In box 80, the sum signals are converted into inverse-log signals. Each inverse-log signal includes a sign bit that represents the results of an exclusive-or of the sign bits of corresponding input and Jacobi coefficient signals.

In box 82, the inverse-log signals and corresponding identity matrix signals $1/a_{ii}$ are summed according to Equation (6) to generate column solution signals $A_j^{-1(k)}$.

In decision box 84, a check is made to determine whether the stopping criterion has been met. In one embodiment of the invention, the criterion is attained when the distance between solutions from two successive iterations is less than a predetermined threshold. In an alternative embodiment of the invention, criterion is reached after repeating the steps of boxes 76–86 a predetermined number of iterations.

If the stopping criterion has been met, the method proceeds to decision box 88. If the criterion has not been achieved, the method continues with box 86.

In box 86, the column solution signals are provided as the next sequence of inputs and the method returns to the step of box 76.

In decision box 88, it is determined whether there is another matrix column j+1 to be processed. If so, the method proceeds to box 90 where input signals representing the next column of the initial approximate inverse matrix $A_{j+1}^{-1(0)}$ are received and the method then returns to box 76. If all of the columns have been processed, the method proceeds to box 92 where output signals representing the inverse matrix $A^{-1}$ are generated as a function of the column solution signals.

In an alternative embodiment of the method shown in FIG. 6, the matrix columns are batch processed, i.e., all of the inverse matrix columns are computed before any check is made with the stopping criterion. In this embodiment, the determination made in box 88 would occur before that of box 84.

Thus, there has been described herein a concept, as well as a preferred embodiment, of a method and system which is used to solve linear systems of equations and invert matrices. Because the various embodiments of the methods and systems as herein-described utilize logarithmic arithmetic, they can substitute addition operations for multiplication operations, which allows a vast improvement in terms of computational speed. The use of logarithmic arithmetic also reduces the amount of power and space consumed by a semiconductor chip that embodies of the present invention.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A system for generating a plurality of output signals that represents a solution to a linear system of equations, comprising:

means for receiving a plurality of coefficient signals representing a matrix;

means for receiving a plurality of input signals representing an approximate solution to the linear system of equations;

log means for converting the plurality of input signals and the plurality of coefficient signals into a plurality of log signals;

means for summing the plurality of log signals to produce a plurality of sum signals;

means for converting the plurality of sum signals into a plurality of inverse-log signals;

means for generating a plurality of approximate solution signals in response to the inverse-log signals;

feedback means for providing the approximate solution signals to the log means; and means for determining whether a predetermined stopping criteria is satisfied;

means for generating the plurality of output signals by executing a sequence of computer program instructions for performing an iterative technique of solving linear systems, the iterative technique performing a plurality of arithmetic operations based upon the plurality on the inverse-log signals, the generating means repeating the iterative technique until the predetermined stopping criteria is satisfied.

2. The system of claim 1, wherein the iterative technique of solving linear systems is based on a technique selected from a group consisting of a Jacobi iterative technique and a Gauss-Seidel iterative technique.

3. The system of claim 1, wherein the generating means includes:

means for executing the iterative technique until reaching a maximum number of iterations.

4. The system of claim 1, wherein the generating means includes:

means for executing the iterative technique until a distance between a plurality of results from two successive iterations is less than a threshold.

5. A system for generating a plurality of output signals that represent a solution to a linear system of equations, comprising:

an interface for receiving a plurality of coefficient signals representing a matrix and a plurality of input signals representing an approximate solution to the linear system of equations;

a log converter for converting the input signals and the coefficient signals into a plurality of log signals;

an adder for summing the plurality of log signals to produce a plurality of sum signals; and an inverse-log converter for converting the plurality of sum signals into a plurality of inverse-log signals;

an accumulator for generating a plurality of approximate solution signals in response to the inverse-log signals and a plurality of constant signals;

feedback means for providing the approximate solution signals to the log converter; and means for determining whether a stopping criteria has been met.

6. The system of claim 5, wherein the iterative technique of solving linear systems is based on a technique selected from a group consisting of a Jacobi iterative technique and a Gauss-Seidel iterative technique.

7. The system of claim 5, wherein the computer processor includes:

means for executing the iterative technique until reaching a maximum number of iterations.

8. The system of claim 5, wherein the computer processor includes:

means for executing the iterative technique until a distance between a plurality of results from two successive iterations is less than a threshold.

9. A method of using a computer processor to generate a solution to a linear system of equations, comprising the following steps:

receiving a plurality of coefficient signals representing a matrix;

receiving a plurality of input signals represent an approximate solution to the linear system of equations;

converting the plurality of input signals and the plurality of coefficient signals into a plurality of log signals;

summing the plurality of log signals to produce a plurality of sum signals;

converting the plurality of sum signals into a plurality of inverse-log signals; and generating a plurality of output signals representing the solution by using the computer processor to perform an iterative technique of solving linear systems, the iterative technique performing a plurality of arithmetic operations based upon the plurality of inverse-log signals and a plurality of constant values, the computer processor repeating the iterative technique until a predetermined stopping criteria is satisfied.

10. The method of claim 9, wherein the iterative technique of solving linear systems is based on a technique selected from a group consisting of a Jacobi iterative technique and a Gauss-Seidel iterative technique.

11. The method of claim 9, wherein the step of generating includes the following sub-steps:

executing the iterative technique until reaching a maximum number of iterations.

12. The method of claim 9, wherein the step of generating includes the following sub-step:

executing the iterative technique until a distance between a plurality of results from two successive iterations is less than a threshold.

13. A method of using a computer processor to generate an inverse matrix having a plurality of columns, the method comprising the following steps:

receiving a plurality of coefficient signals representing a matrix;

receiving a plurality of input signals representing an initial approximation of the inverse matrix;

converting the plurality of input signals and the plurality of coefficient signals into a plurality of log signals;

summing the plurality of log signals to produce a plurality of sum signals;

converting the plurality of sum signals into a plurality of inverse-log signals; and generating a plurality of output signals representing the inverse matrix by:

using the computer processor to perform an iterative technique of solving linear systems, the iterative technique performing a plurality of arithmetic operations based upon the plurality of inverse-log signals and a plurality of constant values, and repeating the iterative technique until the output signals representing inverse matrix converge to values satisfying a predetermined criteria.

14. The method of claim 13, wherein the iterative technique of solving linear systems is based on a technique selected from a group consisting of a Jacobi iterative technique and a Gauss-Seidel iterative technique.

15. The method of claim 13, wherein the step of generating includes the following sub-steps:

executing the iterative technique until reaching a maximum number of iterations.

16. The method of claim 13, wherein the step of generating includes the following sub-step:

executing the iterative technique until a distance between a plurality of results from two successive iterations is less than a threshold.

17. In a digital computer, a method of generating a plurality of output signals that represents a solution to a linear system of equations, comprising the following steps:

(a) receiving a plurality of signals representing a matrix and receiving, transforming the plurality of signals into a plurality of coefficient signals of a Jacobi iterative technique, and converting the plurality of coefficients into a plurality of first log signals;

(b) receiving a plurality of input signals representing an approximate solution to the linear system of equations;

(c) converting the plurality of input signals into a plurality of second log signals;

(d) distributing the first log signals and the second log signals to a plurality of processing elements;

(e) using the processing element to sum corresponding ones of the first log signals and the second log signals to produce a plurality of sum signals;

(f) converting the plurality of sum signals into a plurality of inverse-log signals;

(g) summing the plurality of inverse-log signals and a plurality of vector signals of the Jacobi iterative technique to generate a plurality of solution signals;

(h) feeding back the solution signals as the approximate solution to the linear system of equations;

(i) repeating (b)–(h) based on a predetermined stopping criteria; and (j) generating the plurality of output signals as a function of the solution signals.

18. The method of claim 17, wherein step (e) includes:

concurrently summing the corresponding ones of the first log signals and the second log signals to contemporaneously produce a plurality of sum signals.

19. The method of claim 17, further comprising the steps of:

generating the input signals based on the plurality of solution signals; and repeating steps (c)–(g) until reaching a maximum number of iterations.

20. The method of claim 17, further comprising the steps of:

generating the input signals based on the plurality of solution signals; and repeating steps (c)–(g) until a distance between pluralities of solution signals from two successive iterations is less than a threshold.

21. In a digital computer, a method of generating a plurality of output signals that represents an inverse matrix having a plurality of columns, the method comprising the following steps:

(a) receiving a plurality of signals representing a matrix and transforming the plurality of signals into a plurality of coefficient signals of a Jacobi iterative technique;

(b) converting the plurality of coefficient signals into a plurality of first log signals;

(c) receiving a plurality of input signals representing an approximation of an inverse matrix column;

(d) converting the plurality of input signals into a plurality of second log signals;

(e) distributing the first log signals and the second log signals to a plurality of processing elements;

(f) using the processing element to sum corresponding ones of the first and second log signals to produce a plurality of sum signals;

(g) converting the plurality of sum signals into a plurality of inverse-log signals;

(h) summing the plurality of inverse-log signal and a plurality of identity matrix signals to generate a plurality of column solution signals;

(i) repeating steps (c)–(h) for each of the columns of the inverse matrix, whereby generating pluralities of column solution signals;

(j) feeding back the pluralities of column solution signals as the input signals;

(k) repeating steps (c)–(i) based on a predetermined stopping criteria; and (l) generating the plurality of output signals as a function of the pluralities of column solution signals.

22. The method of claim 21, wherein step (f) includes:

concurrently summing the corresponding ones of the first log signals and the second log signals to contemporaneously produce a plurality of sum signals.

23. The method of claim 21, further comprising the steps of:

generating the input signals based on the plurality of column solution signals; and repeating steps (d)–(h) until reaching a maximum number of iterations.

24. The method of claim 21, further comprising the steps of:

generating the input signals based on the plurality of column solution signals; and repeating steps (d)–(h) until a distance between the plurality of column solution signals from two successive iterations is less than a threshold.

* * * * *